No. 641,035. Patented Jan. 9, 1900.
A. & H. PERRY.
APPARATUS FOR FLAKING RICE.
(Application filed Apr. 8, 1897.)
(No Model.) 8 Sheets—Sheet 1.
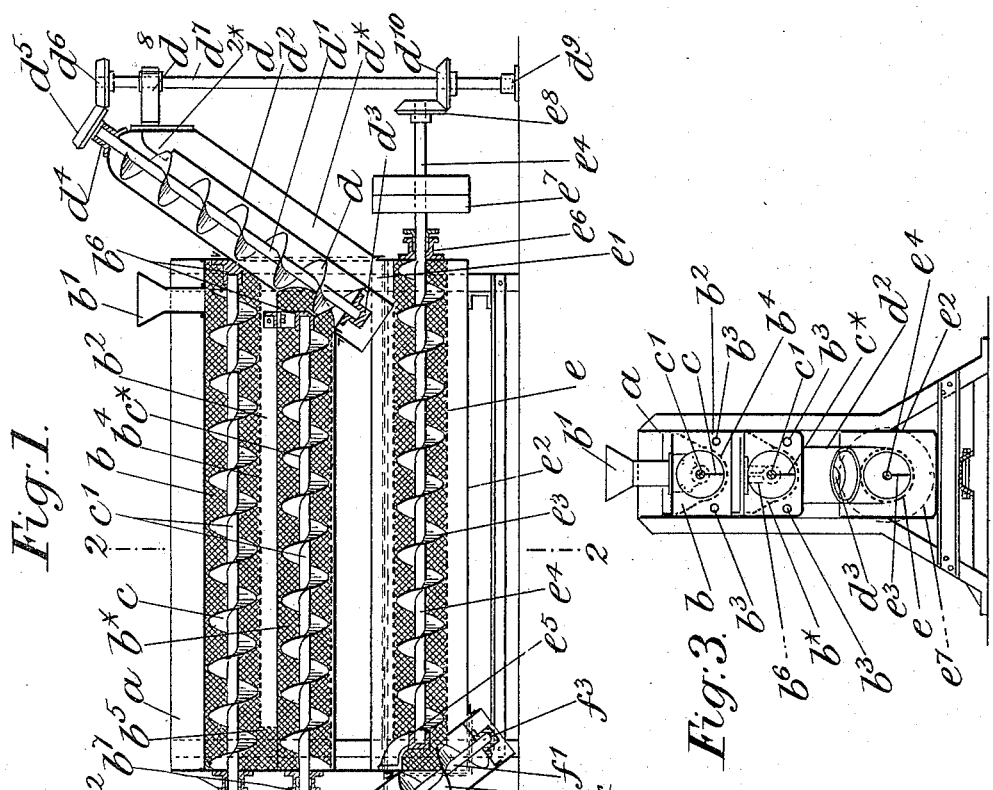
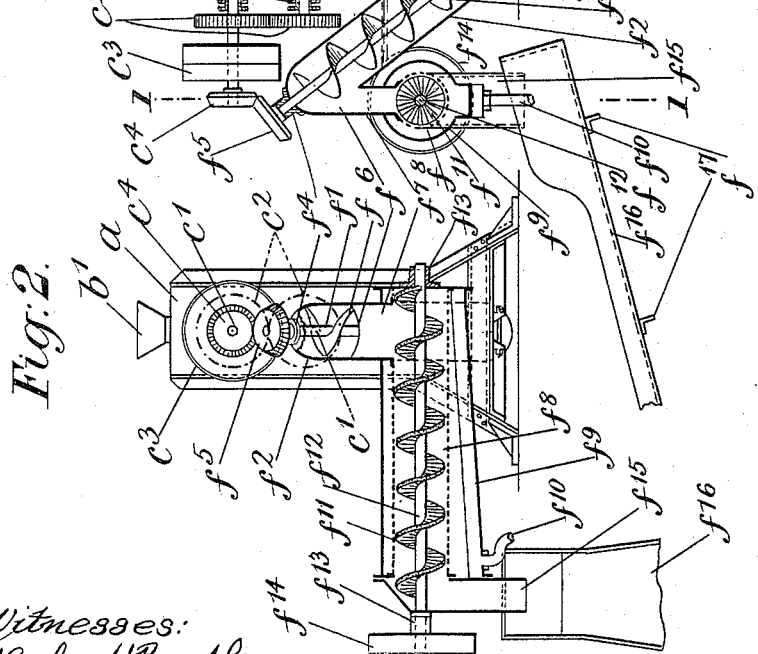
Witnesses:
Herbert Bradley.
Inventors
A. Perry.
H. Perry.
By Knight Bros
Attys.

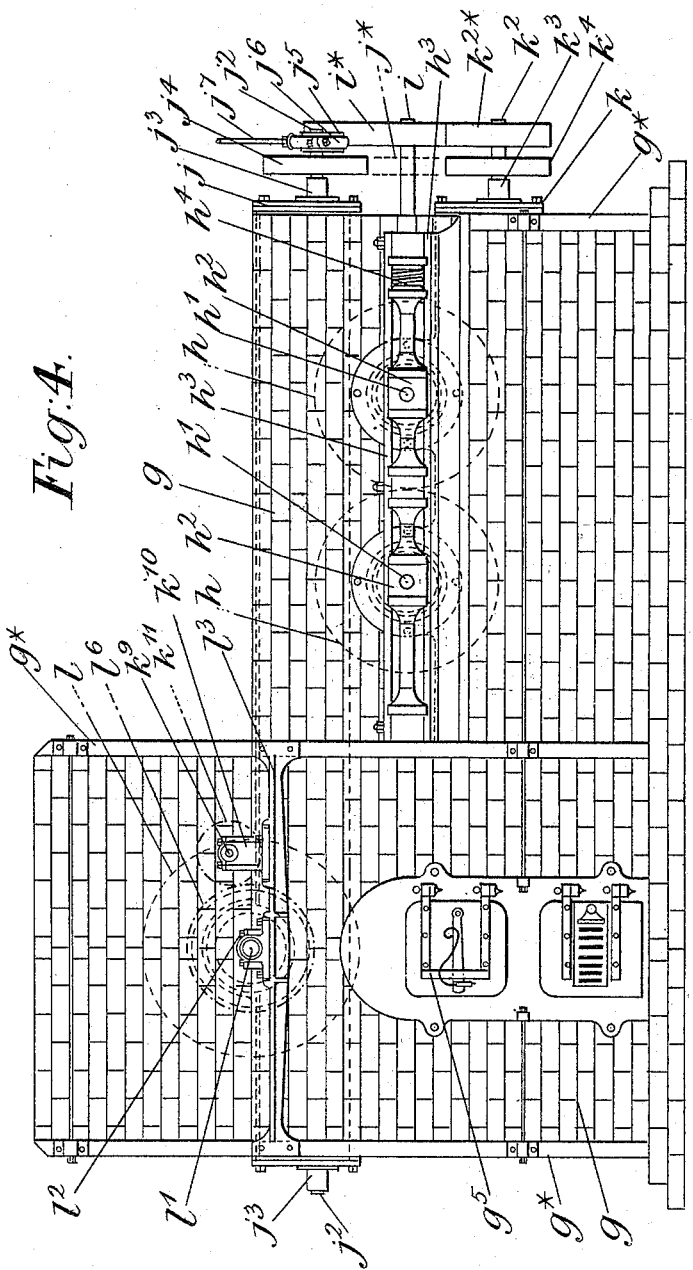

No. 641,035. Patented Jan. 9, 1900.
A. & H. PERRY.
APPARATUS FOR FLAKING RICE.
(Application filed Apr. 8, 1897.)
(No Model.) 8 Sheets—Sheet 3.

Witnesses:
Herbert Bradley.
Fred R. Proctor

Inventors
A. Perry
H. Perry by Knight Bros
Attys.

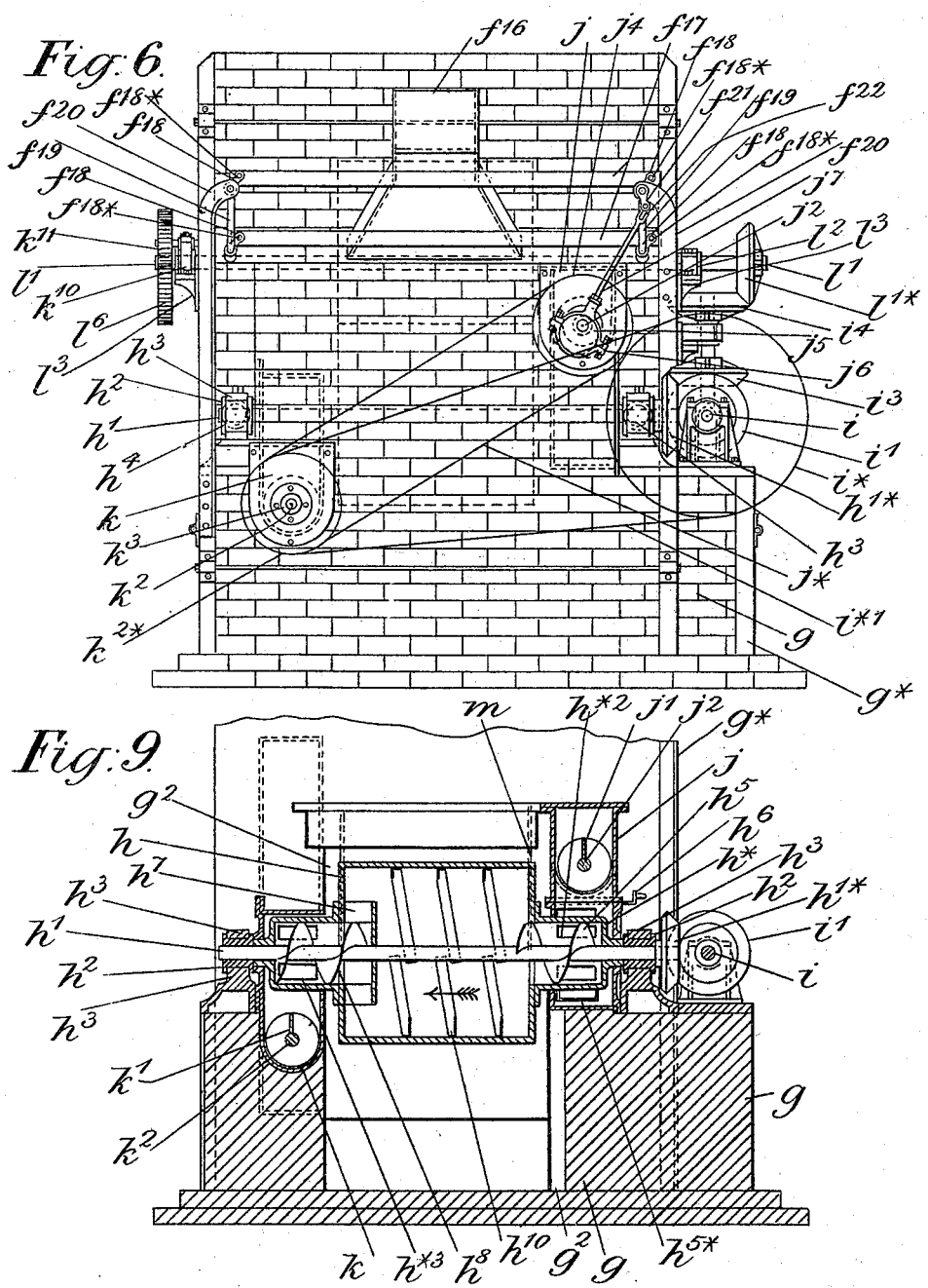

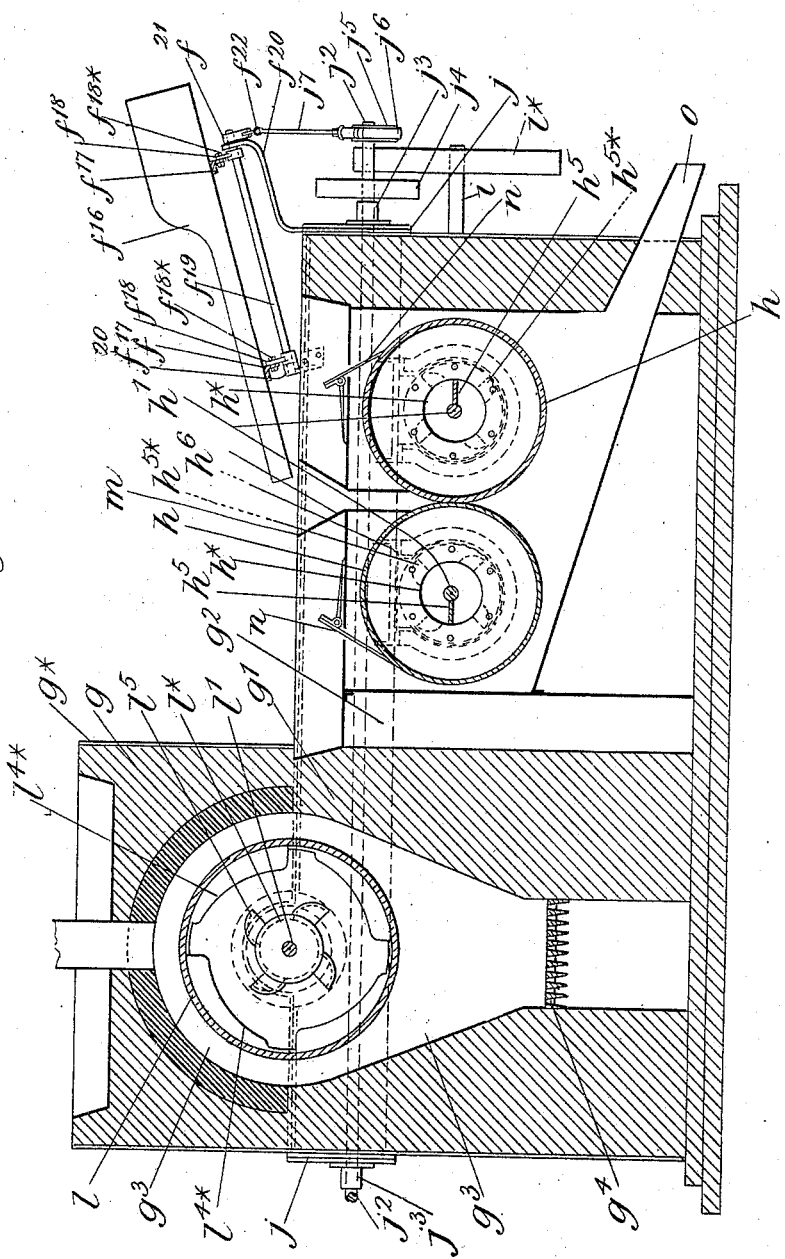

No. 641,035. Patented Jan. 9, 1900.
A. & H. PERRY.
APPARATUS FOR FLAKING RICE.
(Application filed Apr. 8, 1897.)
(No Model.) 8 Sheets—Sheet 6.
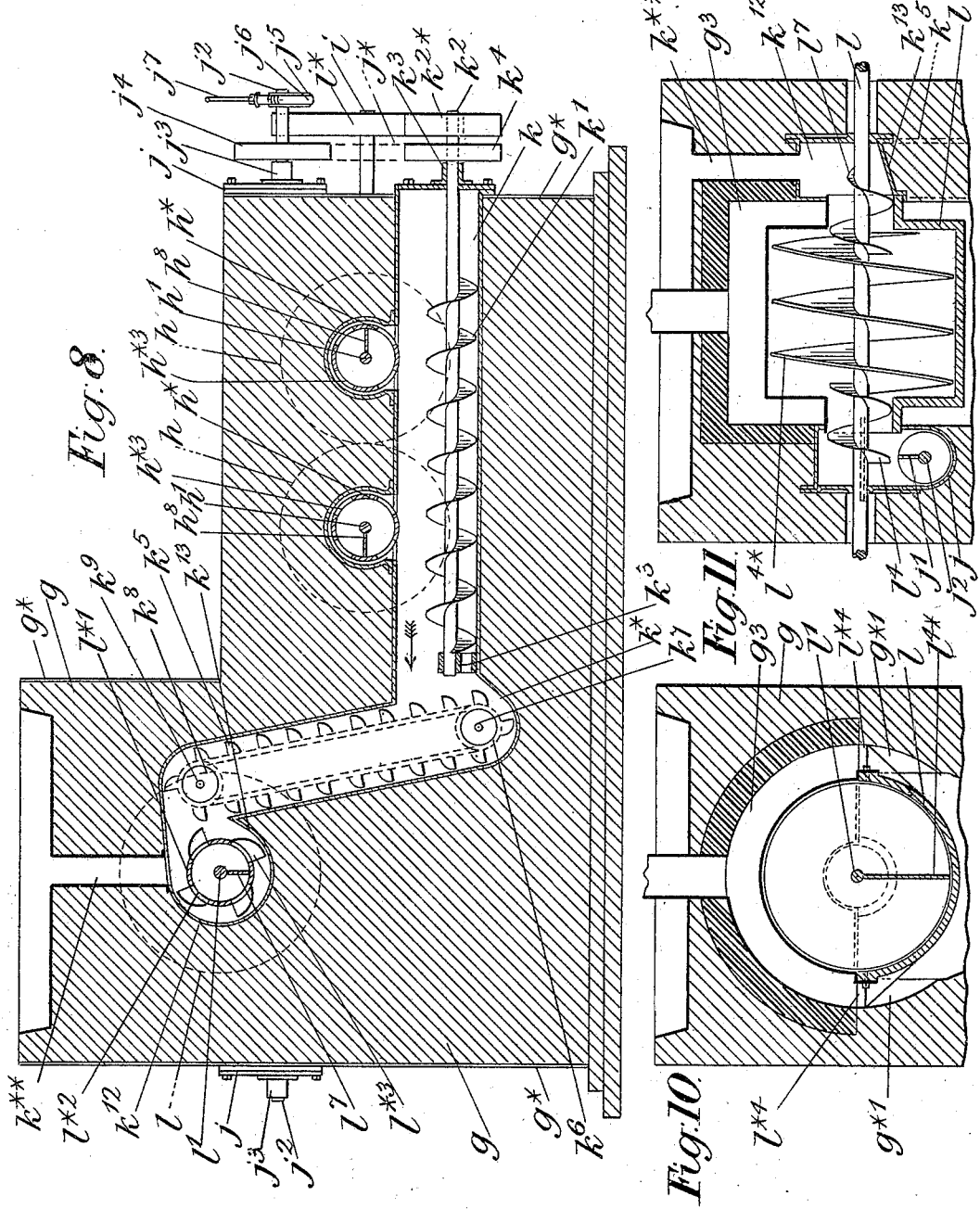

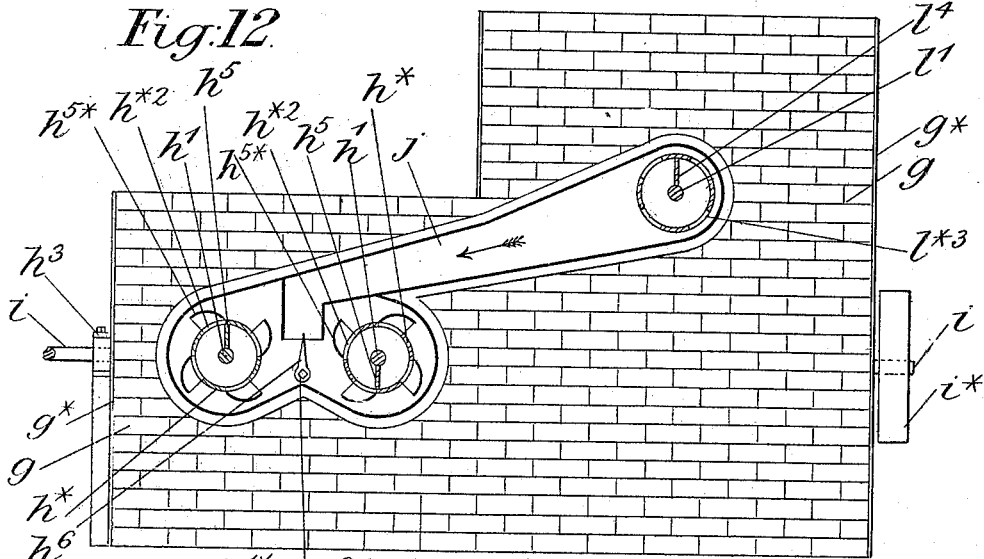

No. 641,035. Patented Jan. 9, 1900.
A. & H. PERRY.
APPARATUS FOR FLAKING RICE.
(Application filed Apr. 8, 1897.)

(No Model.) 8 Sheets—Sheet 8.

UNITED STATES PATENT OFFICE.

ALEXANDER PERRY AND HENRY PERRY, OF LONDON, ENGLAND.

APPARATUS FOR FLAKING RICE.

SPECIFICATION forming part of Letters Patent No. 641,035, dated January 9, 1900.

Application filed April 8, 1897. Serial No. 631,267. (No model.)

*To all whom it may concern:*

Be it known that we, ALEXANDER PERRY and HENRY PERRY, engineers, subjects of the Queen of Great Britain, residing at 71 Fairfield road, Bow, London, in the county of Middlesex, England, have invented certain new and useful Improvements in Apparatus for the Treatment or Preparation of Rice and other Grain or Seed for Brewing and other Purposes, of which the following is a specification, reference being had to the drawings hereunto annexed, and to the letters marked thereon—that is to say:

The object of the present invention is to render rice and other grain or seed more suitable for brewing, distilling, and vinegar making, and for purposes of food or otherwise than heretofore.

According to this invention the grain is first submitted to the action of hot water. It is then passed through cold water, and finally is passed between highly-heated pressure-rollers, by which means the grain is converted and flaked at one operation; and the invention consists in the peculiar construction and arrangement of the apparatus, as hereinafter shown and described.

Figure 5:
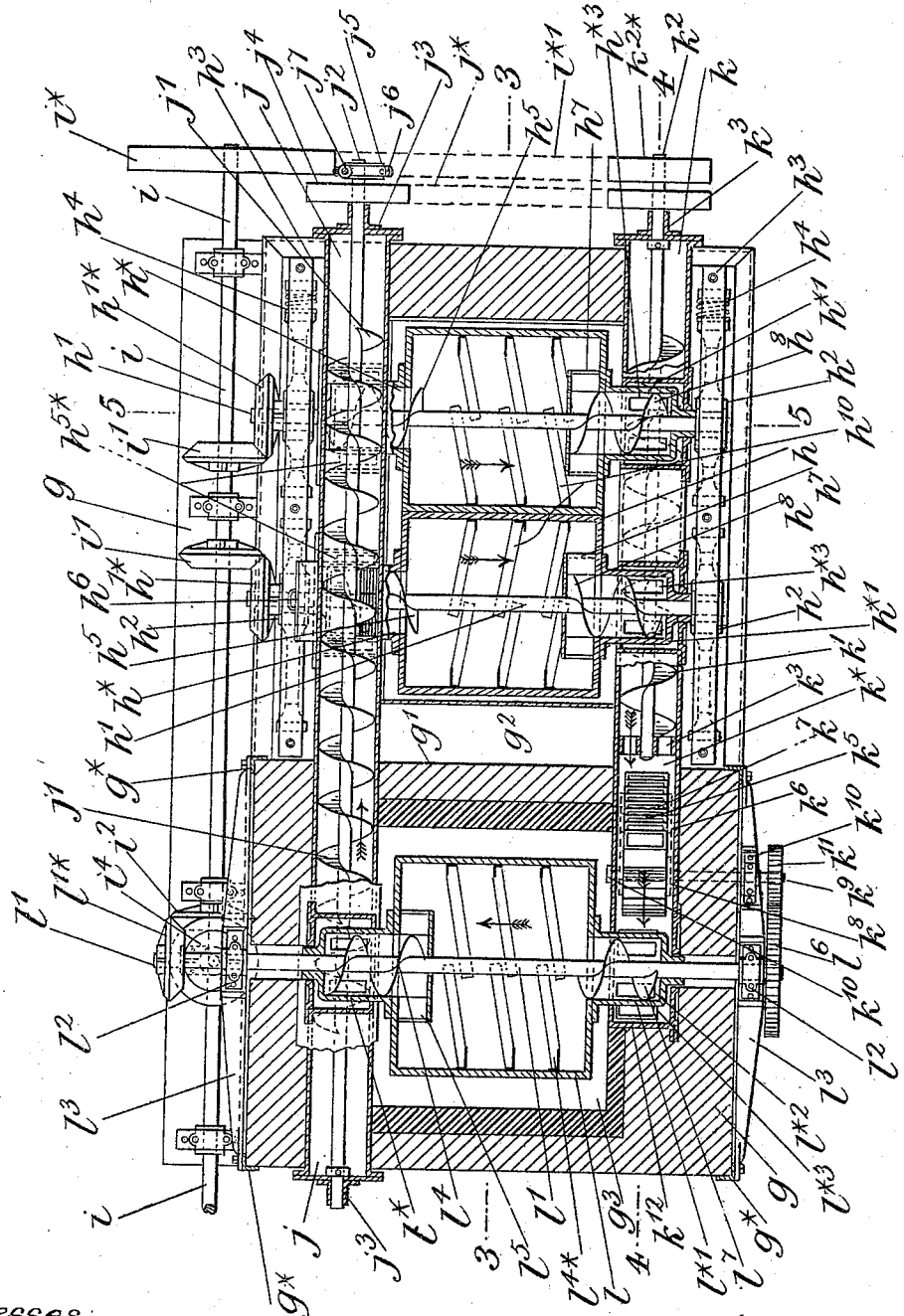
Figure 14:
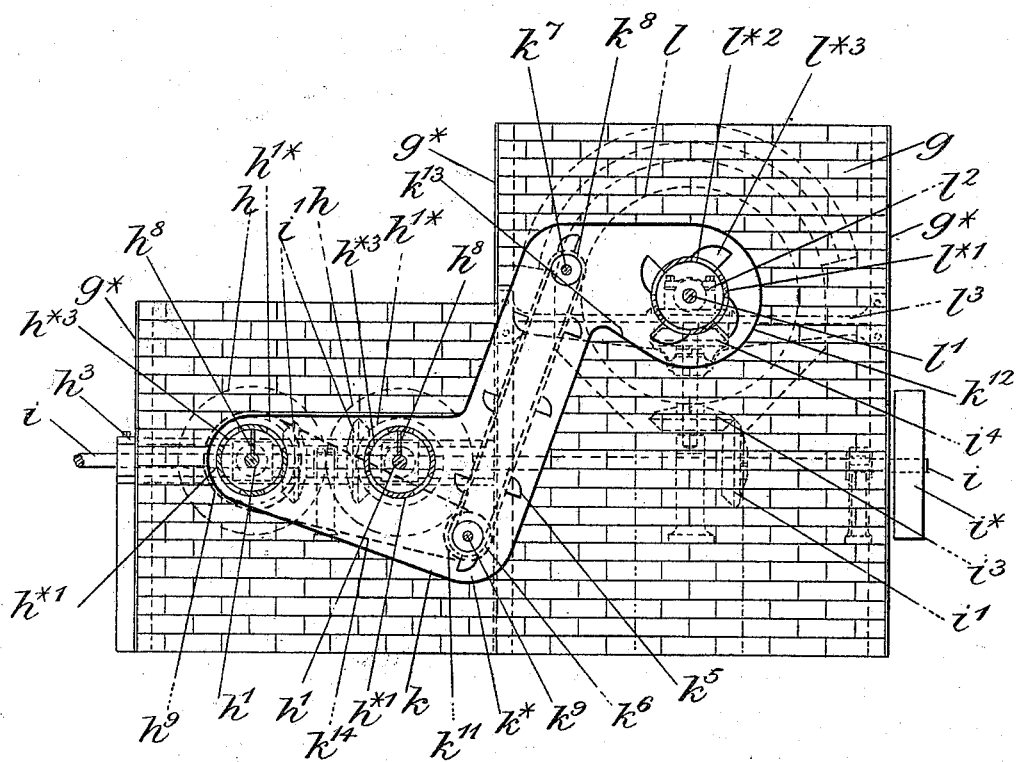

In the accompanying drawings, Figure 1 is a vertical longitudinal section representing an apparatus constructed according to the present invention for preparing the grain in readiness for the subsequent flaking operation. Fig. 2 is a transverse section thereof, taken on the line 1 1 of Fig. 1. Fig. 3 is a similar view taken on the line 2 2 of Fig. 1. Fig. 4 is a front elevation of an apparatus constructed according to the present invention for simultaneously flaking and converting the grain. Fig. 5 is an irregular horizontal section thereof. Fig. 6 is an end elevation thereof. Fig. 7 is a vertical longitudinal section taken on the line 3 3 of Fig. 5. Fig. 8 is a similar view taken on the line 4 4 of Fig. 5. Fig. 9 is a transverse section taken on the line 5 5 of Fig. 5. Fig. 10 is a vertical longitudinal section of part of the machine, but representing a modified form of heating-chamber. Fig. 11 is a transverse section thereof. Fig. 12 is a vertical longitudinal section taken on the line 6 6 of Fig. 13 representing a modified form of flaking and converting apparatus. Fig. 13 is an irregular horizontal section thereof; and Fig. 14 is a similar view to Fig. 12, but taken on the line 7 7 of Fig. 13.

In the several figures like parts are indicated by similar letters of reference.

Referring to Figs. 1 to 3, $a$ represents a suitable frame in which is fixed a perforated sheet-metal or wire-gauze cylinder or chamber $b$, into the upper part of which the rice, barley, or other grain to be treated is fed through a hopper $b'$, and the wire-gauze chamber $b$ is immersed in water contained in a tank $b^2$ and kept in a boiling state by means of a supply of steam from any suitable source issuing from perforated pipes $b^3$. By this treatment the grain is more or less scalded or cooked, and in order that the material may be steeped in the boiling water for a regular and sufficient length of time the wire-gauze or perforated chamber is divided by a horizontal partition $b^4$ into upper and lower compartments $b\ b^*$, or, in other words, it is formed in two lengths placed one above the other within the tank $b^2$ and the horizontal partition $b^4$, which constitutes the floor of the upper compartment, terminates short of the end of the chamber $b$, so as to leave an opening $b^5$ leading from the upper to the lower compartment. Within the upper and lower compartments $b\ b^*$ of the wire-gauze chamber are arranged screw or they might be other suitable conveyers $c\ c^*$, which are fixed upon shafts $c'$, at one end mounted in bearings $b^6$ upon the interior of the tank $b^2$ and at the other end passing through stuffing-boxes $b^7$ upon the exterior thereof, and the shafts $c'$, which are coupled by means of toothed wheels $c^2$ of equal diameter, are driven through a pulley $c^3$, fixed upon the upper shaft $c'$ by means of a band (not shown) from any suitable source of power.

The material under treatment is by the screw conveyer $c$ carried along the upper one, $b$, of the compartments $b\ b^*$ until it falls through the opening $b^5$ into the lower compartment $b^*$, along the entire length of which it is carried by the lower conveyer $c^*$ until it is delivered to an elevator $d$, by which time it is sufficiently scalded or cooked for the purpose in view, the period of immersion being regulated by the length of the perforated chambers or compartments $b\ b^*$ and the speed of rotation of the conveyers $c\ c^*$, as will be readily understood.

The elevator $d$ is fixed upon a shaft $d'$, mounted in an inclined position within a chamber or shaft $d^2$, and the shaft $d'$ is at its lower end received in a footstep-bearing $d^3$, while at its upper end it passes out of the shaft $d^2$, through a bearing $d^4$, and is provided with a beveled wheel $d^5$, which engages a corresponding wheel $d^6$, fixed upon the upper end of a vertical shaft $d^7$, carried in bearings $d^8$ $d^9$ and receiving motion through a beveled wheel $d^{10}$ from a corresponding wheel $e^8$, fixed upon a driven shaft $e^4$, hereinafter described.

The elevator $d$ raises the scalded or cooked material until it falls through an opening $d^{2*}$ in the wall of the chamber or shaft $d^2$, and the material then descends a chute $d^*$ and passes through an opening $e'$ into a wire-gauze or perforated sheet-metal cylinder or chamber $e$, immersed in cold water contained in a tank $e^2$.

Within the wire-gauze cylinder or chamber $e$ is arranged a screw or it might be any other suitable conveyer $e^3$, which is fixed upon a shaft $e^4$, at one end mounted in a bearing $e^5$ and at the other end passing out through a stuffing-box $e^6$, and driven through a pulley $e^7$ by a band (not shown) from a steam or other engine, and the material is by the conveyer $e^3$ carried through the cold water, which has the effect of destroying or removing the stickiness of the grain consequent upon the cooking operation, and thus prevents particles adhering together, while at the same time it effectually separates any of the grains which have adhered together before entering the cold-water tank. This treatment with cold water after the boiling operation is of considerable importance, inasmuch as it enables the grain to be handled and passed through the machinery employed in the subsequent operations without trouble.

After the treatment hereinbefore described, which under favorable conditions will occupy, for example, about five and a half minutes, the material is by the conveyer $e^3$ delivered to a screw elevator $f$, which is fixed upon a shaft $f'$, mounted in an inclined position within a chamber or shaft $f^2$, and the shaft $f'$ is at its lower end received in a foot-step bearing $f^3$, while at its upper end it passes out of the chamber $f^2$ through a bearing $f^4$ and is provided with a beveled wheel $f^5$, which engages a corresponding wheel $c^4$, fixed upon the shaft $c'$. The elevator $f$ raises the material until it falls through an opening $f^6$ in the wall of the chamber or shaft $f^2$, whence it falls through a chute $f^7$ into a wire-gauze or perforated sheet-metal cylinder or drainage-chamber $f^8$, inclosed within a jacket or casing $f^9$, furnished with an outlet or drainage pipe $f^{10}$, and the surplus water is thus removed from the grain and carried away during the passage of the grain through the gauze cylinder $f^8$, which is effected by means of a screw brush $f^{11}$, fixed upon a shaft $f^{12}$ at its ends mounted in bearings $f^{13}$ and driven through a pulley $f^{14}$ by a band (not shown) from the engine. After passing through the drainage-chamber $f^8$ the material is delivered by a chute $f^{15}$ onto an inclined vibratory plate or trough $f^{16}$, which conducts it to the machine hereinafter described. The material is now in proper condition for the subsequent and final operation, which consists in passing it between suitably and highly heated pressure-rollers of large diameter, the effect of which is to more or less saccharify or gelatinize the starchy constituents thereof and flake the same at one operation.

Referring to Figs. 4 to 9, which illustrate the apparatus that it is preferred to employ in carrying out the flaking operation, $g$ represents the walls of the apparatus, which may be composed of brickwork bound by an iron frame $g^*$, as shown, and $g'$ represents an internal partition which divides the structure into two chambers $g^2$ $g^3$. Within the chamber $g^2$ are arranged two pressure-rollers $h$ of large diameter which are fixed upon shafts $h'$, mounted in bearings $h^2$, carried in guides or ways $h^3$, with capability of lateral movement and acted upon by means of a strong spring $h^4$ in order to keep the pressure-rollers $h$ in contact with a strong spring-pressure, and the said rollers are driven through their shafts $h'$ by means of beveled wheels $h'^*$, fixed upon the ends of the shafts, which engage corresponding beveled wheels $i'$, fixed upon a driving-shaft $i$, receiving motion from any suitable source of power.

In order to impart to the pressure-rollers $h$ the necessary degree of heat to convert the grain in its passage between the same and that in a constant and regular manner without injury to the rollers, a body of heated sand or it might be other suitable granular or pulverulent material, such as pulverized coke, is continuously carried or circulated through the pressure-rollers $h$ in the manner hereinafter described.

At each end of the pressure-rollers $h$ and transversely thereof is arranged a long tunnel or chamber $j$ $k$, which tunnels communicate with the pressure-rollers $h$ through hollow necks $h^*$ and $h^{*'}$, provided at each end of the latter, and the tunnels $j$ $k$, which are located at different elevations, are provided with screw conveyers $j'$ $k'$, fixed upon shafts $j^2$ $k^2$, mounted with capability of revolution in bearings $j^3$ $k^3$ and at their ends provided with pulleys $j^4$ $k^4$, coupled by means of a band $j^*$, and the shaft $k^2$ receives motion from the shaft $i$ through a pulley $i^*$, fixed upon the latter, a pulley $k^{2*}$, fixed upon the former, and a coupling-belt $i^{*'}$ for the purpose hereinafter described.

The chamber $g^3$ at one end of the machine constitutes a furnace and is provided with a grate $g^4$ and door $g^5$, and above the grate $g^4$ is arranged a heating-cylinder $l$, which is fixed upon a shaft $l'$, mounted in bearings $l^2$, carried by beams $l^3$, bolted to the iron frame $g^*$, and the shaft $l'$ and heating-cylinder $l$ receive rotary motion through a beveled wheel $l'^*$, fixed upon the former, which through intermediate beveled wheels $i^4 i^3$ engages a corresponding wheel $i^2$, fixed upon the driving-shaft $i$, and the pressure-rollers $h$, tunnels $j\ k$, and heating-cylinder $l$ are, by means of a hopper $k^{**}$, charged with a suitable quantity of sand or the like, which is circulated therethrough in the following manner: The heating-cylinder $l$ receives rotary motion through its shaft $l'$, and around this shaft, at each end thereof, the heating-cylinder is provided with hollow necks $l^* l^{*'}$, and within the neck $l^*$ and fixed therewith is arranged a screw conveyer $l^4$, and within the heating-cylinder $l$ are provided, if necessary, lifters or vanes $l^5$, so that in the rotation of the heating-cylinder $l$ the sand, which has become highly heated therein, is conveyed or flows by gravity into the upper one $j$ of the tunnels, and in order to assist the passage of the sand through the heating-cylinder $l$ the latter is provided with spiral blades $l^{4*}$. The highly-heated sand is carried rapidly along the tunnel $j$ in the direction of the arrows by means of the screw conveyer $j'$, and from this tunnel the heated sand flows by gravity, aided, if desired, by lifters $h^{5*}$ and screws $h^5$, fixed within the hollow necks $h^*$ of the pressure-rollers $h$ through apertures $h^{*2}$ in such necks, and thus into the pressure-rollers $h$, and in order to provide for a proper distribution of the heated sand to each pressure-roller $h$ the first one of such rollers is provided with a regulating-valve $h^6$, which insures a proper proportion of the sand being carried to the second one of the rollers $h$. After giving off its best heat within the pressure-rollers $h$ the sand, which is assisted in its passage through the rollers $h$ by spiral blades $h^{10}$, flows by gravity, aided, if desired, by lifters $h^7$ and feed-screws $h^8$ or the like through apertures $h^{*3}$ into the hollow necks $h^{*'}$ at the opposite ends of the pressure-rollers $h$, whence it flows into the lower one, $k$, of the tunnels, along which it is carried by the screw conveyer $k'$ until it flows into a well or pocket $k^*$, where it encounters an elevator $k^5$, composed of an endless chain of buckets, the lower end of which passes around a supporting or guide wheel $k^6$, loosely mounted upon a stud or axis $k^7$, and the upper end of which passes around a chain-wheel $k^8$, fixed upon a short shaft $k^9$, mounted in bearings $k^{10}$, and at its end provided with a toothed wheel $k^{11}$, which engages a toothed wheel $l^6$, fixed upon the shaft $l'$ of the heating-cylinder $l$, and by these means the elevator $k^5$ lifts the spent sand into a chamber $k^{12}$, formed with an inclined or curved floor $k^{13}$, whence it flows, aided by lifters $l^{*3}$ and a screw $l^7$, through apertures $l^{*2}$ in the hollow neck $l^{*'}$ of the heating-cylinder $l$ into the interior thereof and therefore at the opposite end to that from which it issued.

By the means hereinbefore described the sand is continuously circulated through the heating-cylinder $l$ and the pressure-rollers $h$, and the latter are thus efficiently heated in a regular and continuous manner and without the risk of injury to the parts such as might be occasioned by the employment of highly-heated air or superheated steam, while the sand or equivalent material furnishes a degree of heat which cannot be attained by the aid of ordinary steam and which is necessary for the successful carrying out of the process.

The apparatus hereinbefore described may with advantage be bricked in, as shown, and preferably all surfaces of the parts through which the heated material is conveyed should be protected against the radiation of heat by means of suitable non-conducting material, as will be readily understood.

The material under treatment after passing through the drainage-chamber $f^8$ falls onto the inclined feed plate or trough $f^{16}$, which is carried by transverse bars $f^{17}$, pivotally connected at $f^{18*}$ to short levers or offsets $f^{18}$, fixed upon shafts $f^{19}$, mounted in bearings $f^{20}$, and one of which shafts $f^{19}$ is provided with a short lever or offset $f^{21}$, which is pin-jointed to a universal joint $f^{22}$, carried by the upper end of an eccentric-rod $f^7$, connected with an eccentric-strap $f^6$, encircling an eccentric $f^5$, fixed upon the shaft $f^2$, and the necessary vibratory motion is thus given to the feed plate or trough $f^{16}$. The vibrating feed plate or trough $f^{16}$ delivers the material into a hopper $m$, which leads it in between the pressure-rollers $h$, and the material by the high degree of heat, combined with its moist condition and pressure, is completely converted when it issues from the pressure-rollers $h$ and it is then delivered by a chute or spout $o$ onto an endless belt or other conveyer (not shown) in a finished state, or it might be afterward further dried, if necessary.

In order to remove from the pressure-rollers any flakes of material that may adhere thereto, doctors, plates, or scrapers $n$ are employed.

In the example given at Figs 10 and 11 the heating-chamber $l$ instead of revolving is a fixture, and the shaft $l'$ has fixed therewith an additional screw $l^{4*}$ of large diameter, which assists to carry the sand through the chamber $l$, while to assist in carrying the sand into the heating-chamber $l$ the chamber $k^{12}$ is provided with an inclined floor $k^{13}$. In this case also instead of forming the heating cylinder or chamber entirely of iron the lower half thereof is formed of earthenware flanged at $l^{*4}$ to rest upon buttresses $g^{*'}$, while the upper part is formed of sheet-iron. In other respects the apparatus is assumed to be identical with that hereinbefore shown and described.

In the example given at Figs. 12, 13, and 14 the apparatus is substantially the same as that hereinbefore shown and described with respect to Figs. 4 to 9, except that it is simplified in the following manner: The screw conveyers $j'$ and $k'$ and their driving mechanism are dispensed with and in lieu thereof the tunnels $j$ $k$ are formed inclined, so that the sand will traverse the same simply by gravity, and in lieu of the toothed wheel $k^{11}$ the lift-shaft $k^9$ is provided with a pulley $k^{11}$, and the shaft $h'$ of one of the rollers $h$ is prolonged and provided with a pulley $h^9$, which by a band $k^{14}$ gives motion to the lift-pulley $k^{11}$. The valve $h^6$ for regulating the distribution of sand to the pressure-rollers $h$ is also modified, and in this case consists of an adjustable deflecting-plate $h^6$, mounted upon a shaft $h^{6*}$, and which plate divides the stream of sand and directs it more or less into either pressure-roller $h$, as circumstances may require. In other respects the details of construction are assumed to be substantially the same as those hereinbefore shown and described with respect to Figs. 4 to 9 and therefore do not need to be repeated here.

It will be understood that the various details, such as the character of the conveyers and the driving means, may be varied without departing from the spirit of the invention. For example, the speed of rotation or timing of the pressure-rollers, the heating-chamber, and the various conveyers and lifters or the like may be differently proportioned, as although the gearing and speeds hereinbefore shown and described throughout the specification are at the present time thought to be suitable for the work to be performed experience may show that these and other details require to be modified.

When treating rice and especially some kinds thereof, the preliminary scalding process may be dispensed with and the rice simply moistened with cold water previous to passing it between the pressure-rollers.

By the process and means hereinbefore described the grain, whether rice, barley, oats, or other kind, is in a very rapid and effectual manner cooked or converted and at the same time flaked or reduced to a condition best suited for brewing purposes or for use as food.

Having now particularly described and ascertained the nature of the said invention and in what manner the same is to be performed, we declare that what we claim is—

1. An apparatus for preparing grain or seed for conversion comprising hot and cold water tanks arranged one above the other, chambers arranged within a suitable casing having perforated walls located within said tanks, conveyers for carrying the material through the perforated chambers, a lift for removing the material from the hot water into a chute, and a chute for delivering the material to the cold water, an elevator for removing the material from the cold water, and means for draining the surplus water from the material; substantially as herein shown and described and for the purpose stated.

2. Apparatus for treatment of grain or seed by simultaneously flaking and converting the material, comprising two revolving hollow pressure-rollers open at both ends, between which rollers the material is passed, a heating-chamber open at both ends, a furnace for heating the chamber, and means adapted to continuously circulate a body of sand or pulverulent material through the heating-chamber and the pressure-rollers; substantially as herein described and for the purpose stated.

3. Apparatus for the treatment of grain or seed by simultaneously flaking and converting the material, comprising two revolving hollow pressure-rollers between which the material is passed, a heating cylinder or chamber, a furnace for heating the chamber, a high-level tunnel through which heated sand circulates from the heating-chamber to the pressure-rollers, a conveyer within the tunnel for carrying the heated sand to the pressure-rollers, a valve for distributing the heated sand equally between the pressure-rollers, a low-level tunnel upon the opposite side of the machine into which the heated sand flows from the pressure-rollers, a conveyer for carrying the heated sand along the low-level tunnel toward the heating-chamber, a lift for raising the spent sand again into the heating-chamber, and means for assisting the passage of the sand into, through and out of the heating-chamber and pressure-rollers; substantially as herein shown and described and for the purpose stated.

4. An apparatus for the treatment of grain or seed by simultaneously flaking and converting the material, comprising two revolving hollow pressure-rollers between which the material is passed, a heating-chamber, a furnace for heating the chamber, an inclined tunnel leading from the heating-chamber to the pressure-rollers, an inclined tunnel leading from the pressure-rollers to a point below the heating-chamber and adapted to circulate a body of sand by gravity from the heating-chamber through the inclined tunnels and the pressure-rollers, and a lift for raising the spent sand again into the heating-chamber; substantially as herein shown and described and for the purpose stated.

5. Apparatus for the treatment of grain or seed, comprising the combination of a preparatory apparatus consisting of hot and cold water chambers through which the grain is passed, a drainage apparatus to receive the grain from the cold-water chamber, two pressure-rollers between which the grain is passed after leaving the drainage-chamber, a heating-chamber adjacent to the pressure-rolls, means for continuously circulating a body of sand or pulverulent material through the heating-chamber and pressure-rollers, and means for heating the heating-chamber; substantially as herein shown and described and for the purpose stated.

ALEXANDER PERRY.
HENRY PERRY.

Witnesses:
C. MELBOURNE WHITE,
JOHN D. VENN.